Jan. 31, 1956 R. J. KOUPAL ET AL 2,732,948

FILTERS

Filed Dec. 28, 1953 2 Sheets-Sheet 1

United States Patent Office 2,732,948
Patented Jan. 31, 1956

2,732,948

FILTERS

Robert J. Koupal and Anton A. Kalinske, Tucson, Ariz., assignors to Infilco Incorporated, Tucson, Ariz., a corporation of Delaware Application December 28, 1953, Serial No. 400,602

10 Claims. (Cl. 210—144)

This invention relates to filters of the type wherein an impure liquid is filtered through a filter coat or bed of diatomaceous earth or other filter aid material. For convenience, each filter aid materials will be referred to herein sometimes as diatomite, and filters utilizing filter aid materials as diatomite filters. In particular, the invention relates to improvements in the support of the filter aid coat or bed in such a diatomite filter and in the method of cleaning the filter, with concomitant improvements in the entire filter.

This application is a continuation in part of our copending application, Serial No. 284,155, filed April 24, 1952, now abandoned.

It is an object of this invention to provide an improved diatomite filter.

Another object is to provide an improved support for a bed of filter aid material.

Another object of the invention is to provide a flexible support for a bed or coat of filter aid material.

Another object is to provide an improved diatomite filter including one or a plurality of flexibly supported beds of filter aid material.

Another object is to provide a diatomite filter bed support on which the diatomite bed can be readily retained while filtering is interrupted and from which it can also be readily separated by a cleaning operation.

Another object is to provide a diatomite filter bed support which combines the elasticity of sand beds supporting a diatomite coat with the space-saving characteristics of filters utilizing filter elements or tubes.

Another object is to provide a new cleaning method for a diatomite filter.

Another object is to provide a method of cleaning a filter with air.

Another object is to provide a diatomite filter bed support which, by its own flexing, during cleaning aids in breaking up the diatomaceous filter bed.

Other objects of the invention will become apparent upon consideration of the detailed description and the claims which follow.

Heretofore the filter aid material usually has been deposited in the form of a coat or bed on a rigid support, such as a filter element in form of a tube of ceramic or other porous material or of a helix of wire wound with small clearances over a tubular metallic or ceramic sleeve. Sometimes filter aid material was also used in connection with sand filters of the gravity or pressure type, the material being deposited on the top of the fine sand of the sand bed.

Despite the recognized usefulness of such filter aid materials in connection with sand filters, particularly in view of their ability of retaining amoeba and bacteria and fine organic matter which otherwise pass through sand filters, filter aid materials have not been as widely used with sand filters as with element filters. This is at least partly due to the difficulty of hydraulic classification between fine sand and filter aid materials during backwashing. Filter aid materials have a tendency to be broken off by, and suspended in, the wash water in chunks which do not readily disintegrate and have a specific weight similar to that of fine sand. It has, therefore, often been found difficult to remove the contaminated filter aid material with the wash water without also washing away appreciable quantities of sand.

We suggest to replace the fine sand on which heretofore filter aid materials have been deposited by a flexible woven fabric. The fabric is supported on a layer or bed of discrete particles which are sufficiently heavy and coarse to form a support that is not suspended during backwashing, yet is flexible in the sense that during filtering operations there may be slight movement of the particles to relieve local stresses in the fabric. Thus we retain the elasticity of a sand bed support without the difficulties in hydraulic classification inherent therein.

The layer of discrete particles supporting the fabric can be quite shallow. Thus, the drawback of large space and weight requirements inherent in sand filters is overcome, and the space economy of element filters obtained. This is particularly true when the invention is applied to multi-tray filters.

The woven fabric may be made of synthetic or natural fibers of adequate strength, such as rayon, cotton, nylon, Orlon, Saran, and the like. The material supporting the fabric may be synthetic granular matter, coal, fine gravel, coarse sand, and the like.

The invention will be more readily understood by reference to the drawings wherein.

Figure 1:
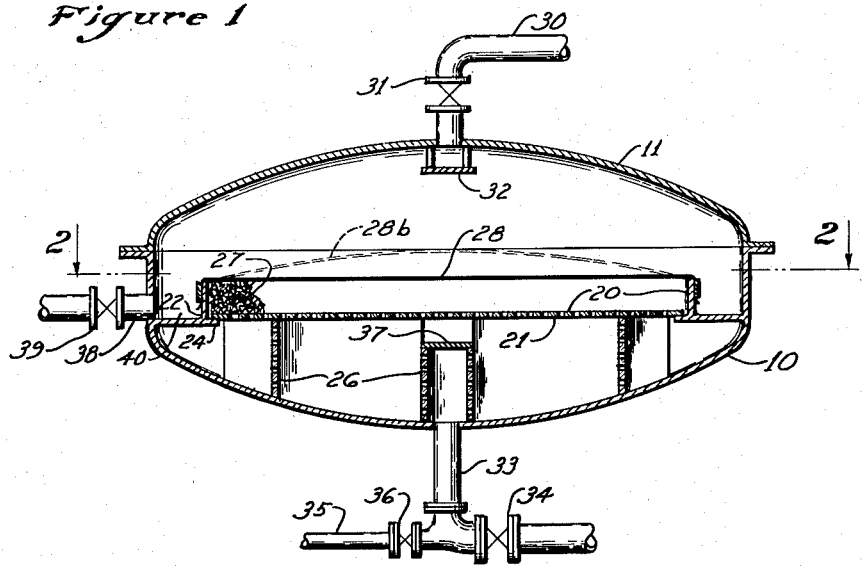
Figure 1 is a vertical cross-sectional view of a filter according to the invention.
Figures 2, 3:
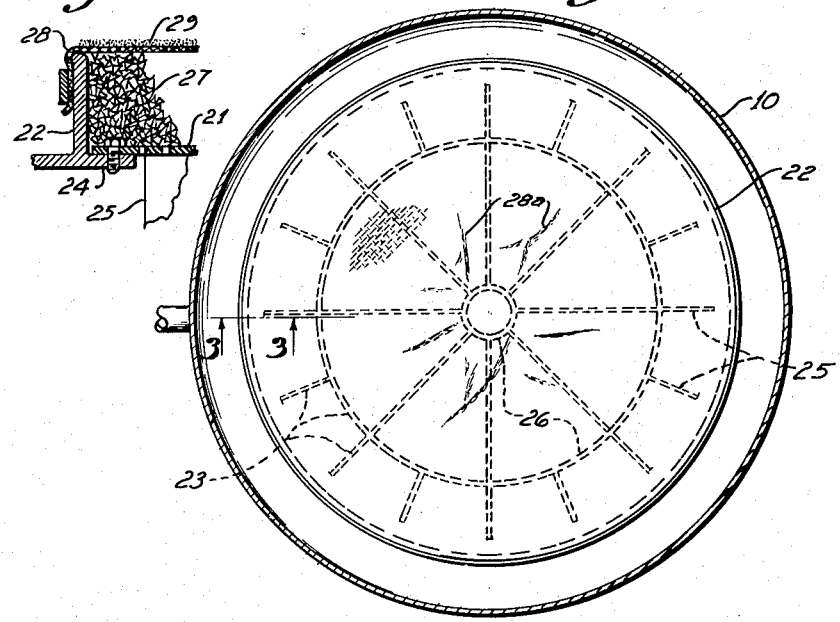
Figure 2 is a horizontal cross-sectional view of the filter of Figure 1 taken along line 2—2 of Figure 1.
Figure 3 is an enlarged partial vertical section view of the filter bed support taken along line 3—3 of Figure 2.
Figure 4:
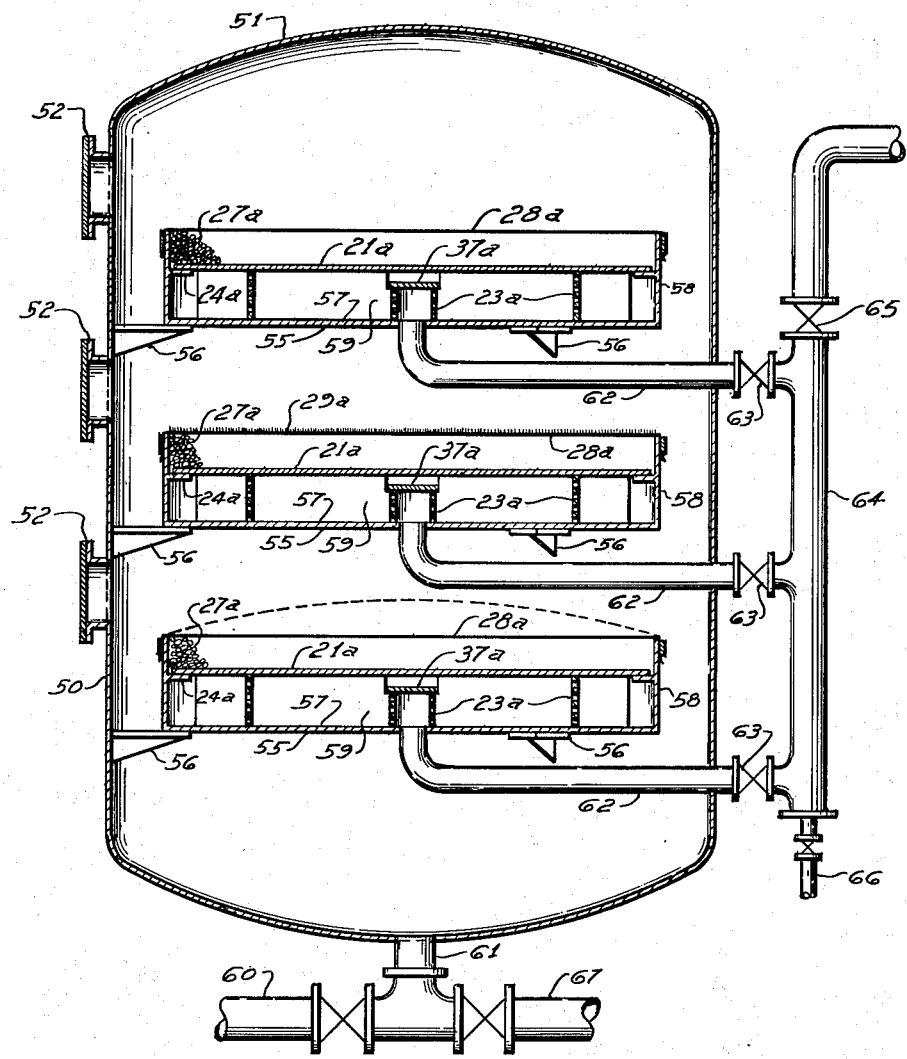
Figure 4 is a vertical sectional view of a multiple tray filter utilizing the invention.

The filter illustrated in Figures 1 to 3 for purposes of exemplification comprises a shell or casing 10 having a top 11. The top 11 may be removable, as shown, and the flanges of the casing 10 and top 11 may be fastened together with bolts, not shown. The top can also be fixed and access to the interior of the filter be provided by a suitable manhole; such a construction is shown in Figure 4.

A filter tray 20 is axially mounted in the casing 10 and comprises a perforated plate 21 and an imperforated boundary retaining wall 22 surrounding the plate 21. The plate 21 is supported on a grid structure 23 carried by the bottom of the shell 10, and its peripheral edge rests on, and may be bolted to, an annular shelf 24 which is mounted on the casing 10. The wall 22 extends upwardly from the shelf 24 and may be integral therewith, as shown. The grid structure 23 comprises a plurality of radial ribs 25 which support the plate 21 and the weight carried by it, and annular perforated members 26 which aid in the distribution of the wash water and prevent surges to the periphery of the filter tray. As shown in Figure 2 some of the radial ribs extend from adjacent the periphery of the plate 21 to the inner annular member 26, and others extend only to the outer annular member 26. While two annular members 26 are shown, more may be used with advantage, the number depending on the size of the filter.

The filter tray formed by the perforated plate 21 and the retaining wall 22 is filled with a bed 27 of fine gravel or other discrete material which is sufficiently heavy and coarse so as not to be expanded during backwashing. A flexible cloth 28 rests loosely on the bed 27 and is flush with the upper edge of the wall 22. The cloth 28 is made of sufficient size that it can be drawn without stretching over the edge of the retaining wall 22 and clamped or otherwise fastened to its outside, as shown. During filtering the cloth 28 lies on the supporting bed with irregular folds, as indicated at 28a in Figure 2. When under backwash pressure, the cloth tends to be expanded or "balloon out" to the position indicated by the dotted line 28b in Figure 1. The coat or bed of diatomite material 29 is deposited on the cloth 28, as shown in Figure 3.

The liquid to be filtered is introduced through an inlet conduit 30 provided with a valve 31 and discharging against a distribution baffle 32. Filtered liquid is withdrawn through a conduit 33 provided with a valve 34. Air for cleaning is discharged under relatively low pressure from an air inlet conduit 35 provided with a valve 36 into the conduit 33. Any wash water used in cleaning the filter likewise is admitted through the conduit 33. A baffle 37 deflects the washing fluid discharged for the conduit 33 laterally to prevent a surge to the central part of the filter tray. A waste conduit 38 provided with a valve 39 leads to outside the filter from the annular launder 40 formed by the shelf 24 and the retaining wall 22.

In operation, the material for forming the filter aid coat preferably is supplied to the filter in suspension in the liquid to be filtered through inlet conduit 30. Until a coat of sufficient thickness has been built up, the liquid carrying the material may be sent to waste, or recirculated, as is well known in the art. When the filter is used in a closed system, such as a swimming pool filter recirculation system, the method of forming a filter aid coat disclosed in Patent No. 2,570,131 can be used with advantage for building up the filter aid coat without waste of water.

Liquid to be filtered is admitted to the filter through inlet conduit 30 and flows down through the filter aid coat 29, the cloth 28, supporting bed 27, and the perforations in plate 21, and is withdrawn through conduit 33 to storage or a point of use, not shown. Filtering can now proceed until the coat of filter aid material becomes clogged by the impurities filtered out of the liquid and must be removed from the cloth 28 and a coat of fresh material be formed.

If desired, a small quantity of filter aid material can be fed continuously to the filter with the incoming liquid to be filtered and be deposited on the filter aid bed 29 during the filter run. This well known procedure permits longer filter runs.

The filter can be cleaned using wash water alone, a combination of wash water and air, or air alone. We have found that the breaking off of the filter aid coat from the supporting material is aided considerably by the use of air under pressure jointly with the wash water and that cleaning with air or some other gas alone is even more efficient and, moreover, eliminates the necessity of disposing of large quantities of wash water. In most installations cleaning with gas will, therefore, be preferable. When cleaning the filter with gas alone, the waste valve 39 is opened to drain the filter. As the water level slowly drops, gas under a relatively low pressure, just sufficient to overcome the hydrostatic head, is admitted to the filter by opening of valve 36. The gas is deflected laterally by baffle 37 and distributed by the annular members 25 of the grid structure 23 and flows upwardly through the perforations of plate 21, the bed 27, and the cloth 28. Under the pressure of the gas bubbling up through the bed and cloth, the cloth 28 is expanded to the position shown in dotted lines at 28b in Figure 1. This flexing of the cloth 28 breaks the filter aid bed 29 from the cloth, and also loosens any particles of dirt that have penetrated into the interstices of the fabric, which are then readily entrained by the gas. The broken off chunks of filter aid material with retained impurities are suspended and further broken up by the gas, and the disintegrated material and dirt are carried over the wall 22 into the launder 40 to be withdrawn with the water draining from the filter through waste conduit 38.

When cleaning is completed and the gas pressure ceases, the cloth 28 drops back onto the gravel, lying loosely on the bed, as indicated at 28a of Figure 2. The filter now is ready for application of a new filter aid coat in the manner described above, followed by a new filter run.

When cleaning the filter with a mixture of wash water and air, the procedure is quite similar, the wash water entering the filter through conduit 33 and air under pressure being discharged into the wash water flowing through the conduit 33. The wash water with the washed out dirt and filter aid coat is withdrawn through launder 40 and waste conduit 38. The procedure is the same when omitting air, but is less efficient.

If for any reason a filter run is interrupted prior to the time when backwashing is necessary, the diatomite bed remains on its cloth support, whether or not the filter is drained. There is no problem of preventing the breaking off of the diatomite bed and no need for resuspending or replacing broken off material. This is a decided advantage over element filters.

The shallowness of the support used for the diatomaceous filter aid material makes it particularly suitable for use in a multi-tray filter.

The multi-tray filter shown in Figure 4 for purposes of illustration has a tank 50 with a closed top 51. Manholes 52 provide access to the interior of the filter. Obviously, the top of filter 50 could be made removable, as shown in Figure 1.

A plurality of filter trays 55 are supported in the tank 50 by any suitable means, such as brackets 56. While three filter trays are shown, it is obvious that more or less can be used, depending on the height of the tank. The diameter of the trays 55 is smaller than the diameter of the tank 50, whereby an annular passageway is formed around the trays which is in open communication with the spaces between the trays.

Each tray 55 has a bottom 57 and an upstanding retaining wall 58. In the lower portion of each tray 55 a perforated plate 21a is supported from the bottom 57. A grid structure 23a, of the type shown in Figures 1 and 2, may be interposed between the bottom 57 and the plate 21a and may include radial ribs serving as support, and annular perforated members serving for wash water distribution. The peripheral edge of the plate 21a may rest on a shelf 24a extending inwardly from the retaining wall 58. The space between the bottom 57 of the tray 55 and the plate 21a forms an underdrain chamber 59. The balance of the space within the tray 55 is filled by a layer 27a of discrete material, such as fine gravel. The layer 27a extends to the upper edge of the retaining wall 58, so that the flexible cloth 28a, which rests loosely thereon, is flush with the edge of the wall 58. The cloth is drawn without stretching over the edge of the wall, and clamped or otherwise fixed to the outside of the wall 58. A filter bed or coat 29a of diatomaceous or other filter aid material is deposited on the cloth 28a, as described in connection with Figure 1.

Liquid to be filtered arrives through a valved inlet conduit 60 connected by a T to a conduit 61, which discharges below the lowermost filter tray 55. The liquid rises through the annular passageway around the filters and flows freely into the space overlying the several filters and filters downwardly through the diatomite beds 29a, the cloths 28a, gravel beds 27a, and the perforations of the plates 21a, into the underdrain chambers 59. Filtered water is withdrawn from the chambers 59 by conduits 62, each provided with a valve 63. The conduits 62 lead to a common header 64, provided with a valve 65, from which the filtered water is conducted to a point of storage or use, not shown.

The header 64 and its branch conduits 62 serve also for introducing the cleaning fluid into the underdrain chambers 59. In cleaning a multi-tray filter of the type shown the beds are cleaned in sequence, starting with the top bed. Thus, while during filtering all valves 63 are open and filtered water is withdrawn from all filters simultaneously, during cleaning the valves 63 are opened one at a time.

As in the embodiment of Figure 1, filter cleaning is most efficiently effected by gas. Cleaning with a combination of wash water and air is efficient but has the disadvantage that a large quantity of wash water must be disposed of. Wash water alone can be used, though with less good results. Air or another suitable gas is admitted to the header 64 through a valved inlet pipe 66. The gas enters the filters through the branch conduit 62 and the underdrain chambers 59. A deflecting baffle 37a may be provided in each underdrain chamber which deflects the fluid laterally. Any water used in the cleaning operation also enters the underdrain chambers 59 through the pipes 63.

Flexing of the cloth 28a under the pressure of the cleaning fluid breaks off the filter coat 29a, and the chunks of diatomite material, suspended and further disintegrated by the gas or wash water or both, are carried over the edge of the wall 58 and removed with the water draining from the filter through the channel around the filter trays and through conduit 61 and a valved waste conduit 67 connected thereto.

It will be seen that the invention provides a greatly improved diatomite filter. The new support for the diatomite coat or bed greatly facilitates cleaning and is economical in its space requirements, and also permits interrupting the filter operation without loosing the diatomite coat.

Cleaning of the filter with air alone eliminates a problem which is serious in many locations, that of disposing of the large quantities of wash water usually needed in cleaning a filter.

While the filters shown and described herein are preferred embodiments and particularly suitable for the new support, they can be modified in many respects without departing from the spirit and scope of the invention.

We claim:

1. In a tray filter having inlet means for liquid to be filtered and filter aid material, a waste outlet, and means for withdrawing filtered liquid and for introducing cleaning fluid, a support for a bed of filter aid material comprising a horizontal perforated plate mounted in said filter and a vertical retaining wall surrounding said plate, a layer of discrete particles on said plate, the weight and size of said particles being sufficient to prevent substantial expansion of said layer under cleaning fluid pressure, and a sheet of flexible fabric supported on said particles and affixed to said wall, said sheet during filtering supporting the bed of filter aid material, and flexing upwardly under cleaning fluid pressure to disintegrate said bed.

2. In a tray type diatomite filter having inlet means for liquid to be filtered and diatomite, a waste outlet, and means for withdrawing filtered liquid and for introducing cleaning fluid, a support for a diatomite bed comprising a horizontal filter tray mounted in said filter and having a bottom and a vertical wall extending upwardly therefrom, a pervious member supported within said tray and forming with said bottom an underdrain chamber in the lower part of the space within said tray, a bed of discrete particles filling the balance of the space within said tray, said particles being of a size and weight to prevent substantial expansion of said bed under cleaning fluid pressure, and a sheet of flexible fabric supported on said bed of discrete particles and affixed to said wall and supporting said diatomite bed during filtering, but flexing upwardly under cleaning fluid pressure to disintegrate said bed.

3. In a filter having inlet means for liquid to be filtered and filter aid material, a waste outlet, and means for withdrawing filtered liquid and for introducing cleaning fluid, a support for a bed of filter aid material comprising a horizontal filter tray mounted in said filter and having a bottom and a vertical wall extending upwardly from said bottom, a distribution grid resting on said bottom, a perforated plate extending across said tray and supported at least in part by said grid, a layer of discrete particles on said plate, said particles being of a size and weight to prevent substantial expansion of said layer under cleaning fluid pressure, said layer of discrete particles extending to the top edge of said wall, and a sheet of flexible fabric loosely supported on said layer of discrete particles and affixed to said wall, said sheet during filtering supporting said bed of filter aid material, and flexing upwardly under cleaning fluid pressure to disintegrate said bed.

4. In a tray filter having inlet means for liquid to be filtered and filter aid material, a waste outlet, and means for withdrawing filtered liquid and for introducing cleaning fluid, a support for a bed of filter aid material comprising a horizontal perforated plate, a distribution grid supported in said filter and supporting said plate, a vertical wall extending upwardly from said plate, a layer of discrete particles on said plate, said particles being of a size and weight to prevent substantial expansion of said layer under cleaning fluid pressure, and a sheet of flexible fabric resting on said layer and affixed to said wall, said sheet supporting said bed of filter aid material during filtering and flexing upwardly under cleaning fluid pressure to disintegrate the bed.

5. In a diatomite filter having a casing, inlet means for liquid to be filtered into the upper portion of said casing outlet means for filtered liquid from the lower portion of said casing and serving also as inlet means for wash fluid, and an outlet to waste, an improved support for a bed of filter aid material comprising a horizontal perforated plate interposed between said inlet means for liquid to be filtered and said outlet means for filtered liquid, the diameter of said plate being smaller than the diameter of said casing, an annular shelf mounted on the wall of said casing and supporting said plate, a vertical wall extending around said plate, a bed of discrete material on said plate, and a flexible cloth supported on said bed and adapted to support a coat of diatomite material introduced into said filter during operation, said shelf and vertical wall forming with said casing a launder, said outlet to waste leading from said launder.

6. In a diatomite filter having inlet means for liquid to be filtered and diatomite, a waste outlet and means for withdrawing filtered liquid and for introducing cleaning fluid, a plurality of superposed diatomite bed supports axially mounted in said filter, each diatomite bed support comprising a horizontal imperforate plate and a vertical boundary wall extending upwardly therefrom, said plate and wall forming a filter tray, the diameter of said tray being smaller than the diameter of said filter, a pervious member supported within said boundary wall in the lower portion of said tray, and forming with said imperforate plate an underdrain chamber, a layer of discrete particles filling the balance of the space within said tray, said particles being of such size and weight to prevent substantial expansion of said layer under cleaning fluid pressure, and a flexible cloth supported by said layer, said cloth during filtering supporting a bed of diatomite, said means for withdrawing filtered liquid and for introducing cleaning fluid being connected to said underdrain chambers.

7. In a diatomite filter including a filter casing having an inlet for liquid to be filtered, means for withdrawing filtered liquid and for introducing cleaning fluid, and a waste outlet, means for supporting a diatomite bed interposed between said inlet and said means for withdrawing filtered liquid, said support means comprising a perforated plate horizontally mounted in said casing and a retaining wall extending upwardly from said plate, a layer of discrete material filling the chamber formed by said plate and wall, the particles of said material being of sufficient size and weight to prevent substantial expansion of said layer under cleaning fluid pressure, and a cloth of flexible material supported on said layer of discrete material flush with the upper edge of said wall, and peripherally fastened to the outside of said wall without stretching, said cloth lying loosely on said material during filtering and supporting the diatomite bed, and flexing upwardly under cleaning fluid pressure to break off said diatomite bed.

8. In a diatomite filter including a casing having inlet means for introducing liquid to be filtered and filter aid material, outlet means for filtered liquid, inlet means for cleaning fluid, and waste outlet means, means for supporting a bed of filter aid material interposed between the inlet means for liquid to be filtered and the filtered liquid outlet means, comprising a perforated plate, means supporting said plate in said filter, a vertical wall extending upwardly from said plate, a layer of discrete material on said plate, and a flexible cloth affixed to said wall and resting on said layer of discrete material during filtering and supporting said bed of filter aid material, and flexing upwardly under cleaning fluid pressure to disintegrate said bed, said layer being sufficiently loosely packed to permit slight movement of the discrete particles to relieve local stresses in said cloth during filtering, said discrete material being sufficiently heavy and large to prevent any substantial suspension of said layer under cleaning fluid pressure.

9. In a tray filter having inlet means for liquid to be filtered and filter aid material, a waste outlet, and means for withdrawing filtered liquid and for introducing cleaning fluid, a support for a bed of filter aid material comprising a filter tray having a bottom and an upstanding wall, a sheet of flexible material affixed to the upper portion of said wall, a layer of discrete particles within said tray and supporting said sheet, the weight and size of said particles being sufficient to prevent substantial expansion of said layer under cleaning fluid pressure, and a pervious member supported within said tray underneath said discrete particles and forming with said bottom an underdrain chamber, said sheet lying loosely on said layer of discrete material and supporting said bed of filter aid material during filtering, and flexing upwardly under cleaning fluid pressure to disintegrate said bed.

10. In a filter having inlet means for liquid to be filtered and filter aid material, a waste outlet, and means for withdrawing filtered liquid and for introducing cleaning fluid, a support for a bed of filter aid material comprising a horizontal imperforate plate and a vertical boundary wall extending upwardly therefrom, said plate and wall forming a filter tray, a pervious member supported within said tray and forming an underdrain chamber in a lower portion of the space within said tray, a bed of discrete particles filling the balance of the space within said tray, the weight and size of said particles being sufficient to prevent substantial expansion of said bed under cleaning fluid pressure, and a flexible fabric sheet supported by said bed of discrete particles and affixed to said wall, so as to rest loosely on said bed of discrete particles during filtering, and flex upwardly under cleaning fluid pressure, the bed of filter aid material being supported on said sheet during filtering and being disintegrated by the upward flexing of said sheet.

References Cited in the file of this patent

UNITED STATES PATENTS

| | | |
|---|---|---|
| 317,457 | Hodgkin et al. | May 5, 1885 |
| 1,062,532 | Blair | May 20, 1913 |
| 1,120,629 | Salisbury | Dec. 8, 1914 |
| 1,724,436 | Sweetland | Aug. 13, 1929 |
| 2,210,210 | Soderquist | Nov. 12, 1940 |
| 2,423,172 | Booth | July 1, 1947 |
| 2,445,287 | Woods | July 13, 1948 |
| 2,594,568 | Lawlor | Apr. 29, 1952 |
| 2,620,927 | Koupal | Dec. 9, 1952 |
| 2,648,440 | Mullins | Aug. 11, 1953 |

FOREIGN PATENTS

| | | |
|---|---|---|
| 371,235 | Germany | Mar. 13, 1923 |